(12) United States Patent
de Rivaz

(10) Patent No.: US 8,462,848 B2
(45) Date of Patent: Jun. 11, 2013

(54) METHOD AND SYSTEM FOR INTRA-MODE SELECTION WITHOUT USING RECONSTRUCTED DATA

(75) Inventor: Peter de Rivaz, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 163 days.

(21) Appl. No.: 12/795,170

(22) Filed: Jun. 7, 2010

(65) Prior Publication Data

US 2011/0150088 A1   Jun. 23, 2011

Related U.S. Application Data

(60) Provisional application No. 61/318,653, filed on Mar. 29, 2010.

(51) Int. Cl.
    *H04N 11/02* (2006.01)
(52) U.S. Cl.
    USPC .................. 375/240.13; 375/240.24
(58) Field of Classification Search
    USPC ........................ 375/240.13, 240.24
    See application file for complete search history.

(56) References Cited

U.S. PATENT DOCUMENTS

| 6,427,029 | B1 * | 7/2002 | Kono et al. | 382/248 |
| 6,571,016 | B1 * | 5/2003 | Mehrotra et al. | 382/236 |
| 2006/0126730 | A1 * | 6/2006 | Arakawa et al. | 375/240.03 |
| 2006/0146930 | A1 * | 7/2006 | Kim et al. | 375/240.03 |

* cited by examiner

*Primary Examiner* — Sath V Perungavoor
*Assistant Examiner* — Jeffery Williams
(74) *Attorney, Agent, or Firm* — Brinks Hofer Gilson & Lione

(57) ABSTRACT

A method and system are provided in which a current block of pixels of a video frame may be encoded and a direction associated with a next block of pixels of the video frame may be estimated. The direction estimation of the next block may be concurrent with the encoding of the current block. The current block and the next block may each be a sub-block in the same macroblock of the video frame. The current block and the next block may both be 4×4 or 8×8 pixel blocks. The encoding may comprise predicting values for the current block based on an estimated direction associated with the current block and values of previously reconstructed pixels adjacent to the current block. The encoding may comprise the generation of reconstructed values of the current block of pixels that may be fed back for the direction estimation associated with the next block of pixels.

20 Claims, 8 Drawing Sheets

METHOD AND SYSTEM FOR INTRA-MODE SELECTION WITHOUT USING RECONSTRUCTED DATA

CROSS-REFERENCE TO RELATED APPLICATIONS/INCORPORATION BY REFERENCE

This application makes reference to, claims priority to, and claims benefit of U.S. Provisional Application Ser. No. 61/318,653, filed Mar. 29, 2010.

This application also makes reference to:
U.S. Patent Application Ser. No. 61/287,269 filed on Dec. 17, 2009;
U.S. Patent Application Ser. No. 61/311,640 filed on Mar. 8, 2010;
U.S. Patent Application Ser. No. 61/315,599 filed on Mar. 19, 2010;
U.S. Patent Application Ser. No. 61/328,541 filed on Apr. 27, 2010;
U.S. Patent Application Ser. No. 61/320,179 filed on Apr. 1, 2010;
U.S. Patent Application Ser. No. 61/312,988 filed on Mar. 11, 2010;
U.S. Patent Application Ser. No. 61/345,421 filed on May 17, 2010;
U.S. Patent Application Ser. No. 61/323,078 filed on Apr. 12, 2010;
U.S. Patent Application Ser. No. 61/326,973 filed on Apr. 22, 2010;
U.S. Patent Application Ser. No. 61/328,422 filed on Apr. 27, 2010;
U.S. Patent Application Ser. No. 61/324,374 filed on Apr. 15, 2010;
U.S. Patent Application Ser. No. 61/321,244 filed on Apr. 6, 2010;
U.S. Patent Application Ser. No. 61/327,553 filed on Apr. 23, 2010;
U.S. Patent Application Ser. No. 61/316,865 filed on Mar. 24, 2010;
U.S. Patent Application Ser. No. 61/319,971 filed on Apr. 1, 2010;
U.S. Patent Application Ser. No. 61/315,620 filed on Mar. 19, 2010;
U.S. Patent Application Ser. No. 61/315,637 filed on Mar. 19, 2010; and
U.S. Patent Application Ser. No. 61/326,849 filed on Apr. 22, 2010.

Each of the above stated applications is hereby incorporated herein by reference in its entirety.

FIELD OF THE INVENTION

Certain embodiments of the invention relate to communication systems. More specifically, certain embodiments of the invention relate to intra-mode selection without using reconstructed data.

BACKGROUND OF THE INVENTION

Image and video capabilities may be incorporated into a wide range of devices such as, for example, cellular phones, personal digital assistants, digital televisions, digital direct broadcast systems, digital recording devices, gaming consoles and the like. Operating on video data, however, may be very computationally intensive because of the large amounts of data that need to be constantly moved around. This normally requires systems with powerful processors, hardware accelerators, and/or substantial memory, particularly when video encoding is required. Such systems may typically use large amounts of power, which may make them less than suitable for certain applications, such as mobile applications.

Due to the ever growing demand for image and video capabilities, there is a need for power-efficient, high-performance multimedia processors that may be used in a wide range of applications, including mobile applications. Such multimedia processors may support multiple operations including audio processing, image sensor processing, video recording, media playback, graphics, three-dimensional (3D) gaming, and/or other similar operations.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for intra-mode selection without using reconstructed data, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for intra-mode selection without using reconstructed data. In accordance with various embodiments of the invention, one or more processors and/or circuits may encode a current block of pixels of a video frame. The one or more processors and/or circuits may estimate a direction associated with a next block of the video frame, wherein the direction estimation of the next block occurs concurrently with the encoding of the current block. The current block and the next block may each be a sub-block in the same macroblock of the video frame. The block of pixels may be 4×4 or 8×8 blocks of pixels, however, the invention need not be so limited and other block sizes may also be utilized.

The encoding may comprise predicting values for the current block based on an estimated direction associated with the current block and values of previously reconstructed pixels adjacent to the current block. The encoding may comprise generating first residual values for the current block based on a difference between values of the current block and the predicted values of the current block. The encoding may comprise pipelined transforming the generated first residual values to generate second residual values. The pipelined transforming may comprise one or more of integer transforming the generated first residual values to generate integer transformed values, quantizing the integer transformed values to generate quantized values, inverse quantizing the quantized values to generate inverse quantized values, and inverse integer transforming the inverse quantized values to generate the second residual values. The encoding may comprise decoding the second residual values utilizing the predicted values of the current block to generate reconstructed values of the current block.

The reconstructed values of the current block may be fed back for the direction estimation associated with the next block. The direction estimation associated with the next block may be based on values of previously reconstructed pixels and values of pixels in the next block.

Figure 1A:
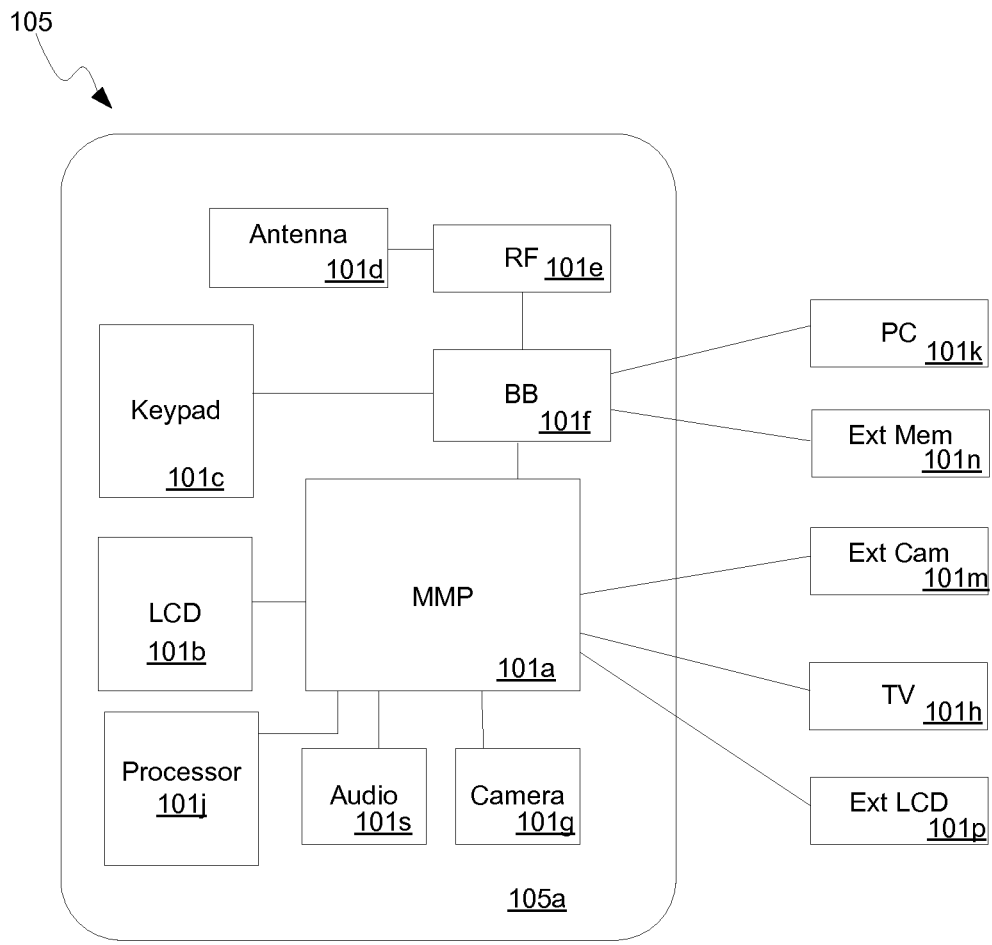
FIG. 1A is a block diagram of an exemplary multimedia system that is operable to provide video processing, in accordance with an embodiment of the invention.

FIG. 1A is a block diagram of an exemplary multimedia system that is operable to provide video processing, in accordance with an embodiment of the invention. Referring to FIG. 1A, there is shown a mobile multimedia system 105 that comprises a mobile multimedia device 105a, a television (TV) 101h, a personal computer (PC) 101k, an external camera 101m, external memory 101n, and external liquid crystal display (LCD) 101p. The mobile multimedia device 105a may be a cellular telephone or other handheld communication device. The mobile multimedia device 105a may comprise a mobile multimedia processor (MMP) 101a, an antenna 101d, an audio block 101s, a radio frequency (RF) block 101e, a baseband processing block 101f, an LCD 101b, a keypad 101c, and a camera 101g.

The MMP 101a may comprise suitable circuitry, logic, interfaces, and/or code that may be operable to perform video and/or multimedia processing for the mobile multimedia device 105a. The MMP 101a may also comprise integrated interfaces, which may be utilized to support one or more external devices coupled to the mobile multimedia device 105a. For example, the MMP 101a may support connections to a TV 101h, an external camera 101m, and an external LCD 101p.

The processor 101j may comprise suitable circuitry, logic, interfaces, and/or code that may be operable to control processes in the mobile multimedia system 105. Although not shown in FIG. 1A, the processor 101j may be coupled to a plurality of devices in and/or coupled to the mobile multimedia system 105.

In operation, the mobile multimedia device may receive signals via the antenna 101d. Received signals may be processed by the RF block 101e and the RF signals may be converted to baseband by the baseband processing block 101f. Baseband signals may then be processed by the MMP 101a. Audio and/or video data may be received from the external camera 101m, and image data may be received via the integrated camera 101g. During processing, the MMP 101a may utilize the external memory 101n for storing of processed data. Processed audio data may be communicated to the audio block 101s and processed video data may be communicated to the LCD 101b and/or the external LCD 101p, for example. The keypad 101c may be utilized for communicating processing commands and/or other data, which may be required for audio or video data processing by the MMP 101a.

In an embodiment of the invention, the MMP 101a may be operable to perform video encoding and/or decoding in a plurality of formats. More particularly, the MMP 101a may be operable to perform encoding operations that may comprise intra-mode compression and/or inter-mode compression of video information.

The intra-mode compression may comprise the use of spatial image compression. That is, the intra-mode compression may be based on information that is comprised within a current video picture. A video picture may refer to a video frame or to a video field. The terms picture, frame, and field may be used interchangeably. Frames that are compressed using the intra-mode compression may be referred to as I-frames, and the blocks of pixels comprised within such frame as I-blocks. During the intra-mode compression, the MMP 101a may be operable to perform direction estimation and/or block encoding.

The inter-mode compression may comprise the use of spatial image compression and/or temporal motion compensation. That is, the inter-mode compression may be based one or more frames that are earlier and/or later than the current video frame. For example, frames that are compressed based on data from previous frames may be referred to as predicted frames or P-frames, and the blocks of pixels comprised within such frame as P-blocks. Frames that are compressed based on data from both previous and subsequent frames may be referred to as bi-predicted frames or B-frames, and the blocks of pixels comprised within such frame as B-blocks. A compressed video sequence may comprise one or more I-frames, P-frames, and/or B-frames, for example. During the inter-mode compression, the MMP 101a may be operable to perform motion estimation and/or block encoding.

The MMP 101a, or like devices, may process video signals with a plurality of video modules, as described below with respect to FIGS. 1B-3.

Figure 1B:
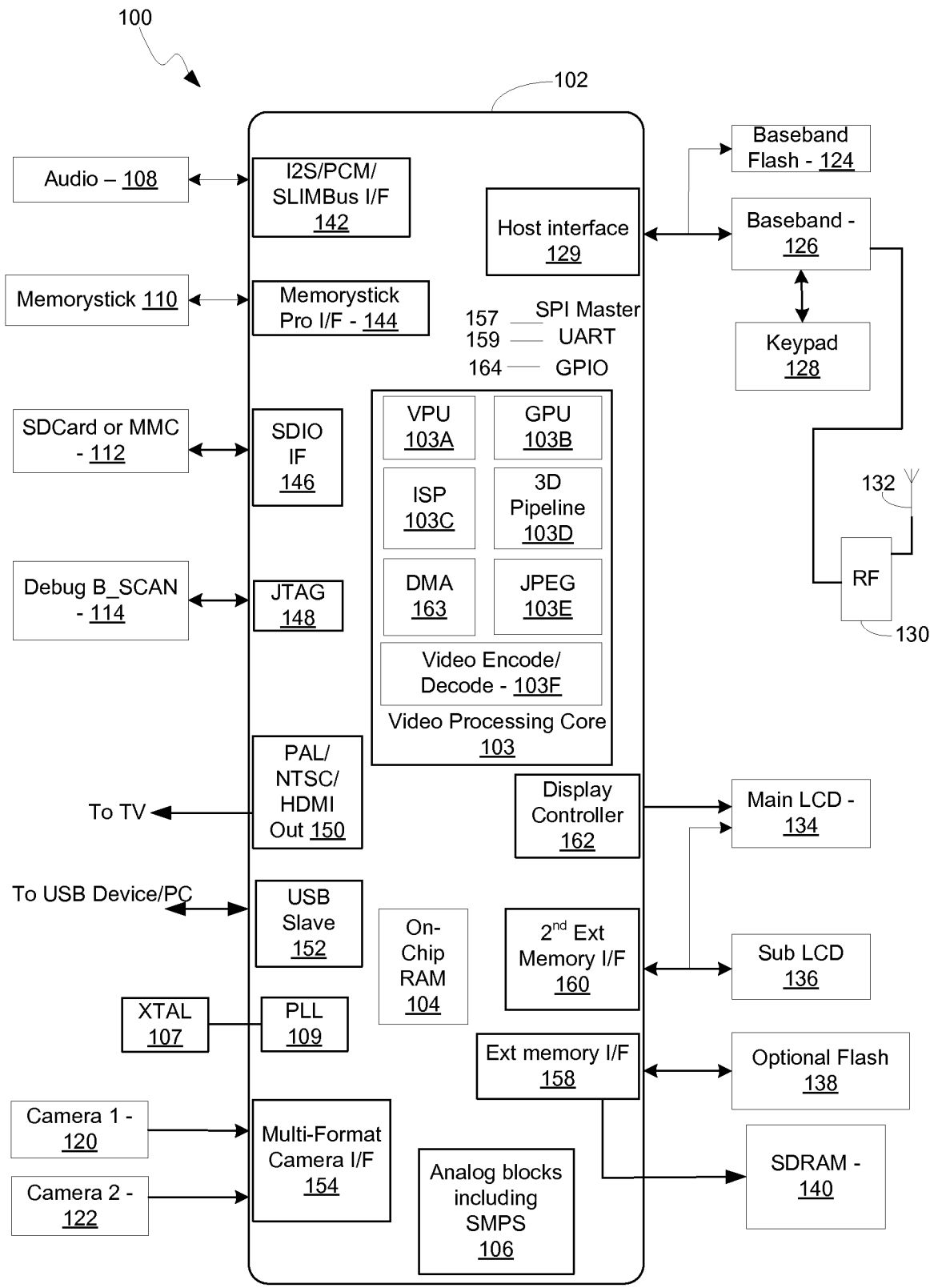
FIG. 1B is a block diagram of an exemplary multimedia processor that is operable to provide video processing, in accordance with an embodiment of the invention.

FIG. 1B is a block diagram of an exemplary multimedia processor that is operable to provide video processing, in accordance with an embodiment of the invention. Referring to FIG. 1B, the mobile multimedia processor 102 may comprise suitable logic, circuitry, interfaces, and/or code that may be operable to perform video and/or multimedia processing for handheld multimedia products. For example, the mobile multimedia processor 102 may be designed and optimized for video record/playback, mobile TV and 3D mobile gaming, utilizing integrated peripherals and a video processing core. The mobile multimedia processor 102 may comprise a video processing core 103 that may comprise a video processing unit (VPU) 103A, a graphic processing unit (GPU) 103B, an image sensor pipeline (ISP) 103C, a 3D pipeline 103D, a direct memory access (DMA) controller 163, a Joint Photographic Experts Group (JPEG) encoding/decoding module 103E, and a video encoding/decoding module 103F. The mobile multimedia processor 102 may also comprise on-chip RAM 104, an analog block 106, a phase-locked loop (PLL)

109, an audio interface (I/F) 142, a memory stick I/F 144, a Secure Digital input/output (SDIO) I/F 146, a Joint Test Action Group (JTAG) I/F 148, a TV output I/F 150, a Universal Serial Bus (USB) I/F 152, a camera I/F 154, and a host I/F 129. The mobile multimedia processor 102 may further comprise a serial peripheral interface (SPI) 157, a universal asynchronous receiver/transmitter (UART) I/F 159, a general purpose input/output (GPIO) pins 164, a display controller 162, an external memory I/F 158, and a second external memory I/F 160.

The video processing core 103 may comprise suitable logic, circuitry, interfaces, and/or code that may be operable to perform video processing of data. The on-chip Random Access Memory (RAM) 104 and the Synchronous Dynamic RAM (SDRAM) 140 comprise suitable logic, circuitry and/or code that may be adapted to store data such as image or video data.

The image sensor pipeline (ISP) 103C may comprise suitable circuitry, logic and/or code that may be operable to process image data. The ISP 103C may perform a plurality of processing techniques comprising filtering, demosaic, lens shading correction, defective pixel correction, white balance, image compensation, Bayer interpolation, color transformation, and post filtering, for example. The processing of image data may be performed on variable sized tiles, reducing the memory requirements of the ISP 103C processes.

The GPU 103B may comprise suitable logic, circuitry, interfaces, and/or code that may be operable to offload graphics rendering from a general processor, such as the processor 101j, described with respect to FIG. 1A. The GPU 103B may be operable to perform mathematical operations specific to graphics processing, such as texture mapping and rendering polygons, for example.

The 3D pipeline 103D may comprise suitable circuitry, logic and/or code that may enable the rendering of 2D and 3D graphics. The 3D pipeline 103D may perform a plurality of processing techniques comprising vertex processing, rasterizing, early-Z culling, interpolation, texture lookups, pixel shading, depth test, stencil operations and color blend, for example. The 3D pipeline 103D may be operable perform tile mode rendering in two separate phases, a first phase comprising a binning process or operation, and a second phase comprising a rendering process or operation The JPEG module 103E may comprise suitable logic, circuitry, interfaces, and/or code that may be operable to encode and/or decode JPEG images. JPEG processing may enable compressed storage of images without significant reduction in quality.

The video encoding/decoding module 103F may comprise suitable logic, circuitry, interfaces, and/or code that may be operable to encode and/or decode images, such as generating full 108p HD video from H.264 compressed data, for example. In addition, the video encoding/decoding module 103F may be operable to generate standard definition (SD) output signals, such as phase alternating line (PAL) and/or national television system committee (NTSC) formats.

The video encoding/decoding module 103F may support a plurality of video formats such as H.264, Windows Media Video (VC-1), Motion Picture Expert Group 1 (MPEG-1), MPEG-2, MPEG-4, and Audio Video Standard (AVS), for example. The video encoding/decoding module 103F, however, need not be so limited and other video formats may also be supported. The video encoding/decoding module 103F may be operable to support video processing operations at the macroblock level and/or at other levels such as a sub-macroblock level. A macroblock may refer to a 16×16 block of pixels, for example. At the sub-macroblock level, the sub-blocks may be one of a plurality of different sizes such as 4×4, 4×8, 8×4, and 8×8, for example. In some instances, however, the video processing supported by the video encoding/decoding module 103F may comprise operations with variable sub-block sizes.

The video encoding/decoding module 103F may support encoding operations that may comprise inter-mode compression and/or intra-mode compression. A common method of inter-mode compression comprises a comparison of two or more pictures to determine areas where motion occurs. This approach may provide an efficient form of video compression by taking advantage of the fact that, in many instances, most of the difference between pictures results from camera and/or object motion. In this regard, one or more motion vectors associated with areas of a picture where motion has been detected may be generated and utilized in inter-mode compression.

The intra-mode compression may be utilized in instances in which retaining a significant portion of the original video information may be important, such as for editing applications, for example. Moreover, the intra-mode compression may be utilized for compression of I-frames in a video sequence as described above. During the intra-mode compression, the video encoding/decoding module 103F may be operable to support encoding operations that may comprise direction estimation and/or block encoding, for example.

Also shown in FIG. 1B are an audio block 108 that may be coupled to the audio interface I/F 142, a memory stick 110 that may be coupled to the memory stick I/F 144, an SD card block 112 that may be coupled to the SDIO IF 146, and a debug block 114 that may be coupled to the JTAG I/F 148. The PAL/NTSC/high definition multimedia interface (HDMI) TV output I/F 150 may be utilized for communication with a TV, and the USB 1.1, or other variant thereof, slave port I/F 152 may be utilized for communications with a PC, for example. A crystal oscillator (XTAL) 107 may be coupled to the PLL 109. Moreover, cameras 120 and/or 122 may be coupled to the camera I/F 154.

Moreover, FIG. 1B shows a baseband processing block 126 that may be coupled to the host interface 129, a radio frequency (RF) processing block 130 coupled to the baseband processing block 126 and an antenna 132, a basedband flash 124 that may be coupled to the host interface 129, and a keypad 128 coupled to the baseband processing block 126. A main LCD 134 may be coupled to the mobile multimedia processor 102 via the display controller 162 and/or via the second external memory interface 160, for example, and a subsidiary LCD 136 may also be coupled to the mobile multimedia processor 102 via the second external memory interface 160, for example. Moreover, an optional flash memory 138 and/or an SDRAM 140 may be coupled to the external memory I/F 158.

In operation, the mobile multimedia processor 102 may be adapted to perform video encoding operations. For example, the video encoding/decoding module 103F may encode video data by the intra-mode compression and/or the inter-mode compression described above based on, for example, the type of frame being compressed. When the intra-mode compression is to be performed, such as for I-frames, for example, the video encoding process may comprise a direction estimation operation and/or a block encoding operation. When the inter-mode compression is to be performed, such as for P-frames and/or B-frames, for example, the video encoding process may comprise a motion estimation operation and/or block encoding operation. The various operations performed during the intra-mode and/or the inter-mode compression may be performed at the macroblock level and/or at a sub-block level.

Figure 2:
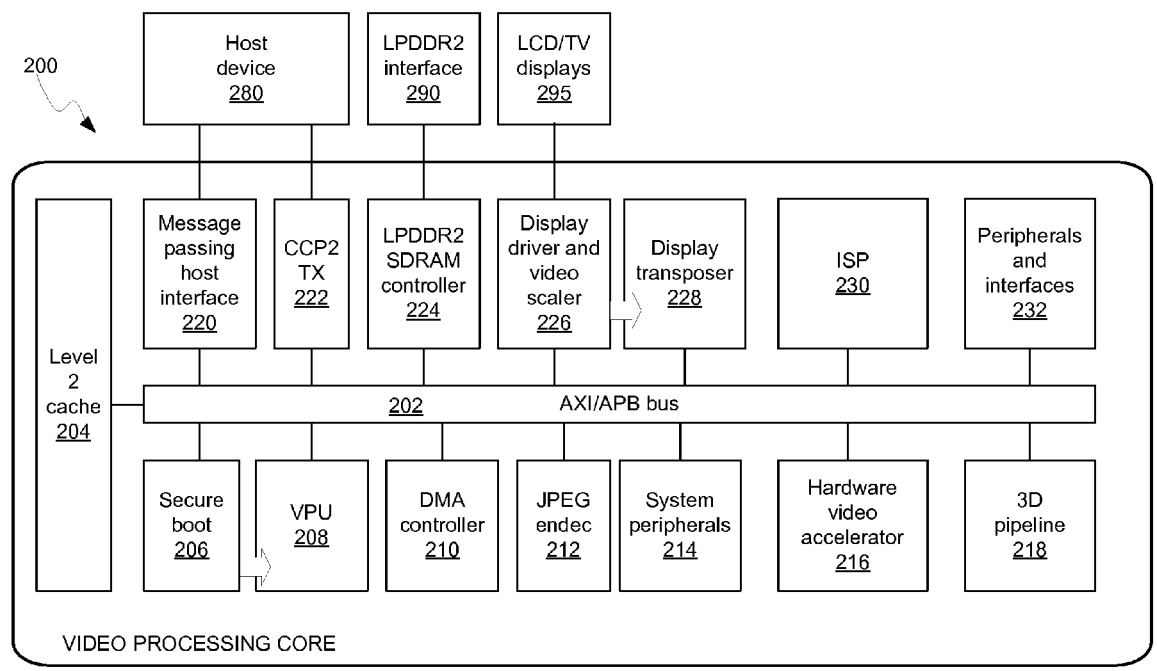
FIG. 2 is a block diagram that illustrates an exemplary video processing core architecture for use in a multimedia processor, in accordance with an embodiment of the invention.

FIG. 2 is a block diagram that illustrates an exemplary video processing core architecture for use in a multimedia processor, in accordance with an embodiment of the invention. Referring to FIG. 2, there is shown a video processing core 200 comprising suitable logic, circuitry, interfaces and/or code that may be operable for high performance video and multimedia processing. The architecture of the video processing core 200 may provide a flexible, low power, and high performance multimedia solution for a wide range of applications, including mobile applications, for example. By using dedicated hardware pipelines in the architecture of the video processing core 200, such low power consumption and high performance goals may be achieved. The video processing core 200 may correspond to, for example, the video processing core 103 described above with respect to FIG. 1B.

The video processing core 200 may support multiple capabilities, including image sensor processing, high rate (e.g., 30 frames-per-second) high definition (e.g., 1080p) video encoding and decoding, 3D graphics, high speed JPEG encode and decode, audio codecs, image scaling, and/or LCD an TV outputs, for example.

In one embodiment of the invention, the video processing core 200 may comprise an Advanced eXtensible Interface/Advanced Peripheral (AXI/APB) bus 202, a level 2 cache 204, a secure boot 206, a Vector Processing Unit (VPU) 208, a DMA controller 210, a JPEG encoder/decoder (endec) 212, a systems peripherals 214, a message passing host interface 220, a Compact Camera Port 2 (CCP2) transmitter (TX) 222, a Low-Power Double-Data-Rate 2 SDRAM (LPDDR2 SDRAM) controller 224, a display driver and video scaler 226, and a display transposer 228. The video processing core 200 may also comprise an ISP 230, a hardware video accelerator 216, a 3D pipeline 218, and peripherals and interfaces 232. In other embodiments of the video processing core 200, however, fewer or more components than those described above may be included.

In one embodiment of the invention, the VPU 208, the ISP 230, the 3D pipeline 218, the JPEG endec 212, the DMA controller 210, and/or the hardware video accelerator 216, may correspond to the VPU 103A, the ISP 103C, the 3D pipeline 103D, the JPEG 103E, the DMA 163, and/or the video encode/decode 103F, respectively, described above with respect to FIG. 1B.

Operably coupled to the video processing core 200 may be a host device 280, an LPDDR2 interface 290, and/or LCD/TV displays 295. The host device 280 may comprise a processor, such as a microprocessor or Central Processing Unit (CPU), microcontroller, Digital Signal Processor (DSP), or other like processor, for example. In some embodiments, the host device 280 may correspond to the processor 101j described above with respect to FIG. 1A. The LPDDR2 interface 290 may comprise suitable logic, circuitry, and/or code that may be operable to allow communication between the LPDDR2 SDRAM controller 224 and memory. The LCD/TV displays 295 may comprise one or more displays (e.g., panels, monitors, screens, cathode-ray tubes (CRTs)) for displaying image and/or video information. In some embodiments, the LCD/TV displays 295 may correspond to one or more of the TV 101h and the external LCD 101p described above with respect to FIG. 1A, and the main LCD 134 and the sub LCD 136 described above with respect to FIG. 1B.

The message passing host interface 220 and the CCP2 TX 222 may comprise suitable logic, circuitry, and/or code that may be operable to allow data and/or instructions to be communicated between the host device 280 and one or more components in the video processing core 200. The data communicated may include image and/or video data, for example.

The LPDDR2 SDRAM controller 224 and the DMA controller 210 may comprise suitable logic, circuitry, and/or code that may be operable to control the access of memory by one or more components and/or processing blocks in the video processing core 200.

The VPU 208 may comprise suitable logic, circuitry, and/or code that may be operable for data processing while maintaining high throughput and low power consumption. The VPU 208 may allow flexibility in the video processing core 200 such that software routines, for example, may be inserted into the processing pipeline. The VPU 208 may comprise dual scalar cores and a vector core, for example. The dual scalar cores may use a Reduced Instruction Set Computer (RISC)-style scalar instruction set and the vector core may use a vector instruction set, for example. Scalar and vector instructions may be executed in parallel.

Although not shown in FIG. 2, the VPU 208 may comprise one or more Arithmetic Logic Units (ALUs), a scalar data bus, a scalar register file, one or more Pixel-Processing Units (PPUs) for vector operations, a vector data bus, a vector register file, a Scalar Result Unit (SRU) that may operate on one or more PPU outputs to generate a value that may be provided to a scalar core. Moreover, the VPU 208 may comprise its own independent level 1 instruction and data cache.

The ISP 230 may comprise suitable logic, circuitry, and/or code that may be operable to provide hardware accelerated processing of data received from an image sensor (e.g., charge-coupled device (CCD) sensor, complimentary metal-oxide semiconductor (CMOS) sensor). The ISP 230 may comprise multiple sensor processing stages in hardware, including demosaicing, geometric distortion correction, color conversion, denoising, and/or sharpening, for example. The ISP 230 may comprise a programmable pipeline structure. Because of the close operation that may occur between the VPU 208 and the ISP 230, software algorithms may be inserted into the pipeline.

The hardware video accelerator 216 may comprise suitable logic, circuitry, and/or code that may be operable for hardware accelerated processing of video data in any one of multiple video formats such as H.264, VC-1, MPEG-1, MPEG-2, and MPEG-4, for example. For H.264, for example, the hardware video accelerator 216 may encode at full HD 1080p at 30 frames-per-second (fps). For MPEG-4, for example, the hardware video acceleration 216 may encode a HD 720p at 30 fps. For H.264, VC-1, MPEG-1, MPEG-2, and MPEG-4, for example, the hardware video accelerator 216 may decode at full HD 1080p at 30 fps or better. The hardware video accelerator 216 may be operable to provide concurrent encoding and decoding for video conferencing and/or to provide concurrent decoding of two video streams for picture-in-picture applications, for example. For example, concurrent encoding and decoding may be achieved by switching at a frame or picture level between encoding and decoding operations.

The hardware video accelerator 216 may be operable to support video processing operations at the macroblock level and/or at a sub-macroblock level. At the sub-macroblock level, the sub-blocks may be one of a plurality of different sizes such as 4×4, 4×8, 8×4, and 8×8, for example. In some instances, however, the video processing supported by the hardware video accelerator 216 may comprise operations with variable sub-block sizes. The hardware video accelerator 216 may support encoding operations that may comprise intra-mode compression and/or inter-mode compression.

During the intra-mode compression, the hardware video accelerator 216 may be operable to perform compression based on information that is comprised within a current frame. During the intra-mode compression, the hardware video accelerator 216 may be operable to support encoding operations that may comprise direction estimation and/or block encoding. In this regard, the hardware video accelerator 216 may be operable to encode a current sub-block of pixels of a video frame and estimate a direction associated with a next sub-block of pixels of the video frame, wherein the direction estimation of the next sub-block of pixels may be performed concurrently with the encoding of the current sub-block of pixels.

The 3D pipeline 218 may comprise suitable logic, circuitry, and/or code that may be operable to provide 3D rendering operations for use in, for example, graphics applications. The 3D pipeline 218 may support OpenGL-ES 2.0, OpenGL-ES 1.1, and OpenVG 1.1, for example. The 3D pipeline 218 may comprise a multi-core programmable pixel shader, for example. The 3D pipeline 218 may be operable to handle 32M triangles-per-second (16M rendered triangles-per-second), for example. The 3D pipeline 218 may be operable to handle 1 G rendered pixels-per-second with Gouraud shading and one bi-linear filtered texture, for example. The 3D pipeline 218 may support four times (4×) full-screen anti-aliasing at full pixel rate, for example.

The 3D pipeline 218 may comprise a tile mode architecture in which a rendering operation may be separated into a first phase and a second phase. During the first phase, the 3D pipeline 218 may utilize a coordinate shader to perform a binning operation. The coordinate shader may be obtained from a vertex shader at compile time, for example. In one embodiment of the invention, the coordinate shader may be obtained automatically during vertex shader compilation. The coordinate shader may comprise those portions of the vertex shader that relate to the processing of the coordinates of the vertices. Such coordinates may be utilized to, for example, control the binning operation and need not be stored for subsequent use such as during the second phase, for example.

The JPEG endec 212 may comprise suitable logic, circuitry, and/or code that may be operable to provide processing (e.g., encoding, decoding) of images. The encoding and decoding operations need not operate at the same rate. For example, the encoding may operate at 120M pixels-per-second and the decoding may operate at 50M pixels-per-second depending on the image compression.

The display driver and video scaler 226 may comprise suitable logic, circuitry, and/or code that may be operable to drive the TV and/or LCD displays in the TV/LCD displays 295. In this regard, the display driver and video scaler 226 may output to the TV and LCD displays concurrently and in real time, for example. Moreover, the display driver and video scaler 226 may comprise suitable logic, circuitry, and/or code that may be operable to scale, transform, and/or compose multiple images. The display driver and video scaler 226 may support displays of up to full HD 1080p at 60 fps.

The display transposer 228 may comprise suitable logic, circuitry, and/or code that may be operable for transposing output frames from the display driver and video scaler 226. The display transposer 228 may be operable to convert video to 3D texture format and/or to write back to memory to allow processed images to be stored and saved.

The secure boot 206 may comprise suitable logic, circuitry, and/or code that may be operable to provide security and Digital Rights Management (DRM) support. The secure boot 206 may comprise a boot Read Only Memory (ROM) that may be used to provide secure root of trust. The secure boot 206 may comprise a secure random or pseudo-random number generator and/or secure (One-Time Password) OTP key or other secure key storage.

The AXI/APB bus 202 may comprise suitable logic, circuitry, and/or interface that may be operable to provide data and/or signal transfer between various components of the video processing core 200. In the example shown in FIG. 2, the AXI/APB bus 202 may be operable to provide communication between two or more of the components the video processing core 200.

The AXI/APB bus 202 may comprise one or more buses. For example, the AXI/APB bus 202 may comprise one or more AXI-based buses and/or one or more APB-based buses. The AXI-based buses may be operable for cached and/or uncached transfer, and/or for fast peripheral transfer. The APB-based buses may be operable for slow peripheral transfer, for example. The transfer associated with the AXI/APB bus 202 may be of data and/or instructions, for example.

The AXI/APB bus 202 may provide a high performance system interconnection that allows the VPU 208 and other components of the video processing core 200 to communicate efficiently with each other and with external memory.

The level 2 cache 204 may comprise suitable logic, circuitry, and/or code that may be operable to provide caching operations in the video processing core 200. The level 2 cache 204 may be operable to support caching operations for one or more of the components of the video processing core 200. The level 2 cache 204 may complement level 1 cache and/or local memories in any one of the components of the video processing core 200. For example, when the VPU 208 comprises its own level 1 cache, the level 2 cache 204 may be used as complement. The level 2 cache 204 may comprise one or more blocks of memory. In one embodiment, the level 2 cache 204 may be a 128 kilobyte four-way set associate cache comprising four blocks of memory (e.g., Static RAM (SRAM)) of 32 kilobytes each.

The system peripherals 214 may comprise suitable logic, circuitry, and/or code that may be operable to support applications such as, for example, audio, image, and/or video applications. In one embodiment, the system peripherals 214 may be operable to generate a random or pseudo-random number, for example. The capabilities and/or operations provided by the peripherals and interfaces 232 may be device or application specific.

In operation, the video processing core 200 may be operable to carry out multiple multimedia tasks simultaneously without degrading individual function performance. In various exemplary embodiments of the invention, the hardware video accelerator 216 may be operable to provide encoding and/or decoding of video data in one or more video formats. In this regard, the hardware video accelerator 216 may be operable to provide encoding operations in which the intra-mode compression of video frames may comprise a direction estimation operation and/or a block encoding operation.

Figure 3:
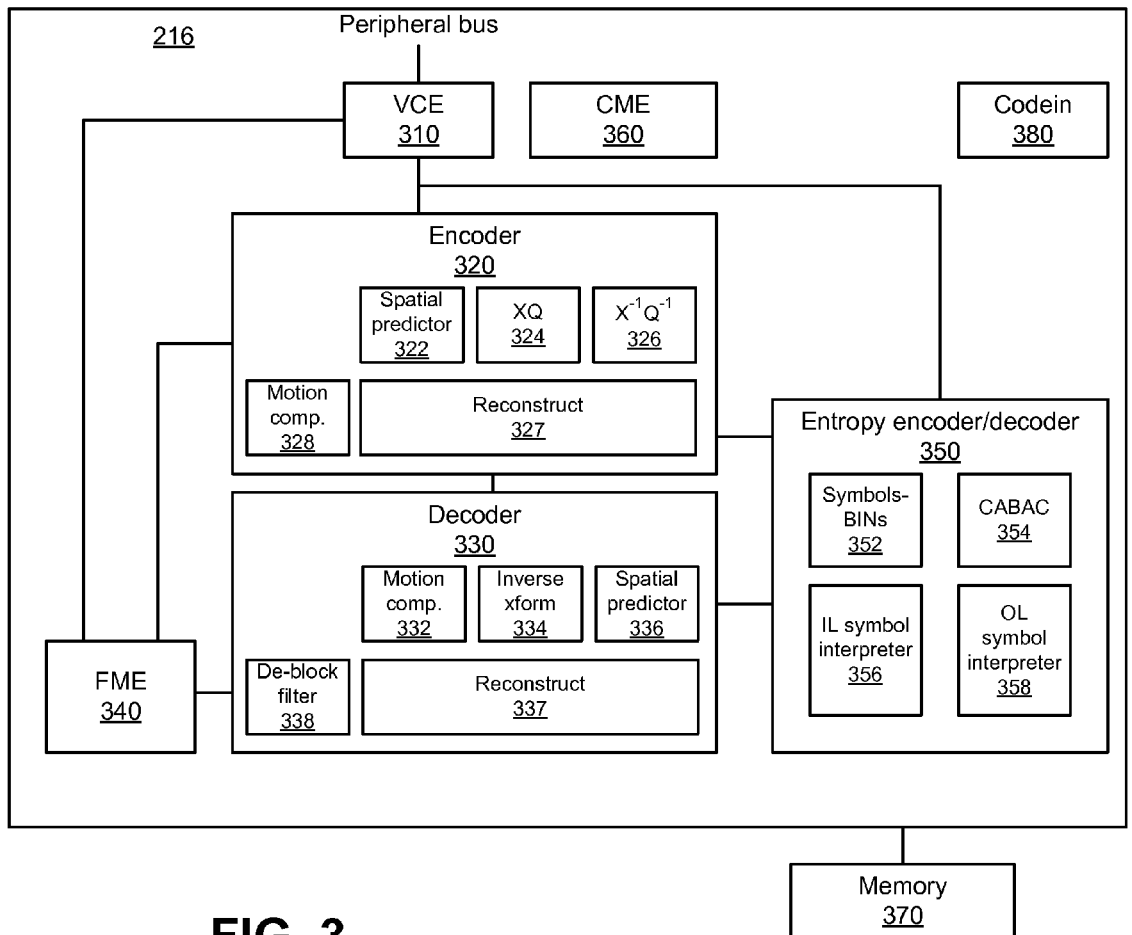
FIG. 3 is a block diagram that illustrates an exemplary hardware video accelerator, in accordance with an embodiment of the invention.

FIG. 3 is a block diagram that illustrates an exemplary hardware video accelerator, in accordance with an embodiment of the invention. Referring to FIG. 3, there is shown a more detailed view of the hardware video accelerator 216 described above with respect to FIG. 2. The hardware video accelerator 216 may be operable to provide video encoding and/or video decoding operations. In this regard, the video encoding operations may support intra-mode compression and/or inter-mode compression based on the type of frames being compressed. When the intra-mode compression is selected to compressed I-frames, for example, such compression operation may comprise a direction estimation operation and/or a block encoding operation. Moreover, when the intra-mode compression is selected, the hardware video accelerator 216 may be operable to encode a current sub-block of pixels of a video frame and estimate a direction associated with a next sub-block of pixels of the same video frame in such a manner that the direction estimation of the next sub-block of pixels may be performed concurrently with the encoding of the current sub-block of pixels.

The hardware video accelerator 216 may comprise a plurality of components and/or modules, such as a video control engine (VCE) 310, an encoder 320, a decoder 330, a fine motion estimator (FME) 340, an entropy encoder/decoder 350, a coarse motion estimator (CME) 360, and a codein module 380, for example. Also shown in FIG. 3 is a memory 370 communicatively coupled to the hardware video accelerator 216.

The codein module 380 may comprise suitable logic, circuitry, interfaces, and/or code that may be operable to, for example, receive an H.264 input stream of bytes and store those bytes as linked lists of network access layer (NAL) units in system memory. The codein module 380 may also remove any emulation prevention (EP) bytes present in the input stream.

The CME 360 may comprise suitable logic, circuitry, interfaces, and/or code that may be operable to encode and/or search subsampled images to find good block matches. The CME 360 may be utilized as a first stage or first pass in video encoding. The CME 360 may operate on half-resolution YUV images of a current frame and on one or more reference frames or pictures. The CME 360 may operate on macroblocks and may be operable to find a motion vector for each macroblock, wherein the motion vector is such that results in the lowest sum of absolute differences (SAD). The CME 360 may perform such operations through an exhaustive search, for example.

The VCE 310 may comprise suitable logic, circuitry, interfaces, and/or code that may be operable to perform low latency operations during video processing. For example, the VCE 310 may be operable as a single-cycle processor with low latency access to the registers (not shown) in the hardware video accelerator 216. In this regard, when the hardware video accelerator 216 is processing bit streams of encoded data, such as for software-based video codecs, for example, the low latency and short pipeline of the VCE 310 may enable decisions or operations to be performed on a cycle-by-cycle basis. The VCE 310 may receive and/or transfer information via a peripheral bus, for example.

The FME 340 may comprise suitable logic, circuitry, interfaces, and/or code that may be operable to encode and/or to search half and quarter pixel motion vectors to improve the accuracy of the block matches. The FME 340 may be operable to perform a full search of one or more areas of one or more reference images to find a closest match to each partition of a block in the current image. The FME 340 may be operable to provide an interactive hardware assist, which may be used by the processor to, for example, calculate the total cost of encoding a particular partitioning of a macroblock. The FME 340 may be operable to store the current image and, to avoid re-fetching, the FME 340 may make this information available to other portions of the hardware video accelerator 216. The FME 340 may also be operable to provide an alternative to motion vector prediction and to automate coupling between the FME 340 and the encoder 320.

The encoder 320 may comprise suitable logic, circuitry, interfaces, and/or code that may be operable to perform encoding operations. For example, the encoder 320 may be operable to transform and/or predict pixel values. The encoder 320 may be operable to compute or determine the overall processing cost of various different possible encoding modes. The encoder 320 may comprise a spatial predictor 322, a transform/quantizer (XQ) module 324, an inverse transform/quantizer ($X^{-1}Q^{-1}$) module 326, a reconstruct module 327, and a motion compensation module 328. A more detailed description of the operation of the various components and/or modules of the encoder 320 is provided below in accordance with an exemplary encoding operation of the hardware video accelerator 216.

The entropy encoder/decoder 350 may comprise suitable logic, circuitry, interfaces, and/or code that may be operable to translate between quantized coefficients, and other symbols used such as motion vector residuals, for example, and the compressed bit stream. The entropy encoder/decoder 350 may be utilized during both encoding and decoding operations. The entropy encoder/decoder 350 may comprise a plurality of components and/or modules such as a symbol-to/from-BINs (symbols-BINs) module 352, a context-adaptive binary arithmetic coding (CABAC) module 354, an inner loop (IL) symbol interpreter 356, and an outer loop (OL) symbol interpreter 358. The entropy encoder/decoder 350 may also be operable to support context-adaptive variable length coding (CAVLC), for example. A more detailed description of the operation of the various components and/or modules of the entropy encoder/decoder 350 is provided below in accordance with exemplary decoding and encoding operations of the hardware video accelerator 216.

The decoder 330 may comprise suitable logic, circuitry, interfaces, and/or code that may be operable to perform decoding operations. For example, the decoder 330 may be operable to reconstruct pixel values from extracted symbols. The decoder 330 may be operable to predict pixel values, from surrounding pixels or pixels from other frames or pictures, and combine the predicted pixel values with a transformed residual. The decoder 330 may be operable to perform nonlinear filtering of pixel values. Such filtering operations by the decoder 330 may be shared with the encoder 320, for example. The decoder 330 may comprise a plurality of components and/or modules such as a motion compensation module 332, an inverse transform/quantizer ($X^{-1}Q^{-1}$) module 334, a spatial predictor 336, a reconstruct module 337, and a de-block filter 338, for example. A more detailed description of the operation of the various components and/or modules of the decoder 330 is provided below in accordance with exemplary decoding operation of the hardware video accelerator 216.

The memory 370 may comprise suitable logic, circuitry, interfaces, and/or code that may be operable to store data utilized during video processing operations of the hardware video accelerator 216. The memory 370 may be utilized to store data associated with encoding and/or decoding operations, for example. In one embodiment of the invention, the memory 370 may be accessed by the hardware video accelerator 216 through the AXI/APB bus 202 described above with respect to FIG. 2.

In an exemplary decoding operation by the hardware video accelerator 216 for H.264 video format, NAL units may be identified within the H.264 bit stream and the codein module 380 may be utilized to recognize and/or strip out stuffing bytes. The OL symbol interpreter 358 of the entropy encoder/decoder 350 may read symbols in headers such that CABAC commands may be constructed. The CABAC module 354 of the entropy encode 350 may read a coded bit stream from, for example, a buffer in system memory, such as memory 370, for example, and may parse symbol elements to extract decoded binary symbols (BINs), which may be stored in another buffer in system memory. When CAVLC streams are considered, the extraction of BINs may not need to be performed.

The IL symbol interpreter 356 of the entropy encoder/decoder 350 may read symbols describing each macroblock, such as skip flags and/or macroblock type, for example. In this regard, the hardware video accelerator 216 may support substantially similar operations at the macroblock and/or at the sub-macroblock level. Depending on the macroblock type, the IL symbol interpreter 356 may be instructed to extract other information such as motion vectors, intra-mode bits, and/or residual coefficients, for example. When instructed, the IL symbol interpreter 356 may read in a sequence of symbols and may write the extracted information to the appropriate portion of the decoder 330. For a block in an I-frame or I-block, for example, the information may refer to symbols describing the intra-mode prediction direction the spatial predictor 336 of the decoder 330, followed by symbols describing quantized coefficients to the $X^{-1}Q^{-1}$ module 334 of the decoder 330. For a block in a P-frame or P-block, for example, the information may refer to motion vectors to the motion compensation module 332 of the decoder 330 and quantized coefficients to the $X^{-1}Q^{-1}$ module 334.

The spatial predictor 336 may predict, for I-blocks, for example, the pixel values for a macroblock from neighboring pixel values. The motion compensation module 332 may, for P-blocks and blocks in a B-frame or B-blocks, for example, read pixel values from previously decoded frames or pictures and may also filter the pixel values to compute, for example, quarter-pixel resolution motion compensated prediction for the macroblock.

The reconstruct module 337 of the decoder 330 may combine the predicted values with the residual differences by adding and/or saturating to, for example, 8-bit value. These values may be fed back to the spatial predictor 336 for use in subsequent I-blocks, for example. The de-block filter 338 of the decoder 330 may apply a nonlinear filtering operation to the reconstructed pixel values to remove artifacts that may have resulted from block edges and may store the reconstructed values in main or system memory.

For MPEG and VC-1 video decoding, for example, operations substantially similar to the one described above with respect to H.264 video decoding may be utilized. In such instances, however, the use of the CABAC module 354 and the codein module 380 may not be necessary.

In an exemplary encoding operation by the hardware video accelerator 216 for H.264 video format, there may be a first stage or first pass to compute a coarse motion estimate for each macroblock and a second stage or second pass to refine the estimates and construct a visual bit stream.

During the first pass, image data captured by the ISP 230 may be saved as a full resolution image and as a sub-sampled image, which may be sub-sampled by a factor of 2 in both x and y directions, for example. The coarse motion estimate, for example, may be done on the sub-sampled image. The CME 360 may be instructed to fetch strips of a double-pelled reference frame into local memory (not shown) in the CME 360. The CME 360 may conduct a full search over a specifiable search window, and may compute the SAD between the reference and current macroblock. Such sum may be computed for luminance and/or chrominance information. The CME 360 may keep track of the best block match. The best motion vector and SAD for each macroblock may be returned at the end of the first pass.

During the second pass, pixel data may be converted to a visual bit stream by first instructing the FME 340 to load a current macroblock. Coarse motion vector estimates may be loaded from memory and a decision may be made as to a number of candidate motion vectors to evaluate. For each candidate, the FME 340 may be instructed to load the appropriate reference data and conduct a search at quarter-pixel resolution. The SAD result for each of the possible block sizes may be computed in parallel during the search and the best motion vector for each reference picture may be stored in a buffer (not shown) in the FME 340. Concurrently, the spatial predictor 322 of the encoder 320 may, for I-blocks, determine a best choice. The encoder 320 may be instructed to compare the cost of encoding with each possible block size. The cost may be, for example, a sum of the bits to transmit the motion vector residual in addition to the bits to encode the transformed residual.

The motion compensation module 328 of the encoder 320 may compute the predicted image data for the chosen block size, using either a single reference frame or picture or a bidirectional mode, for example. At this point, the difference between the current macroblock and the best mode may be computed. The residual image may be transformed and quantized by the XQ module 324 of the encoder 320. The quantized coefficients may be fed to both the entropy encoder/decoder 350 and to the $X^{-1}Q^{-1}$ module 326 of the encoder 320. The $X^{-1}Q^{-1}$ module 326 may reverse the transform and quantization operations in a manner substantially similar to that provided by the decoder 330. The reconstruct module 327 of the encoder 320 may compute the decoded pixel values, which may then be fed back to the spatial predictor 322 for use in subsequent I-blocks. The pixel values may also be fed to the de-block filter 338 of the decoder 330. The symbols-BINs module 352 may translate the quantized coefficients into symbolic BIN values that may be stored in external memory, such as the memory 370, for example. The CABAC module 354 may read the BIN values and may convert them into a visual bit stream.

For MPEG-4 video encoding, for example, an operation substantially similar to the one described above with respect to H.264 video encoding may be utilized. In such instances, however, use of the CABAC module 354 may not be necessary.

The configuration and/or operations of the hardware video accelerator 216 described above are provided by way of example and need not be so limited. Other configurations and/or operations may be implemented in accordance with one or more embodiments of the invention.

Figure 4:
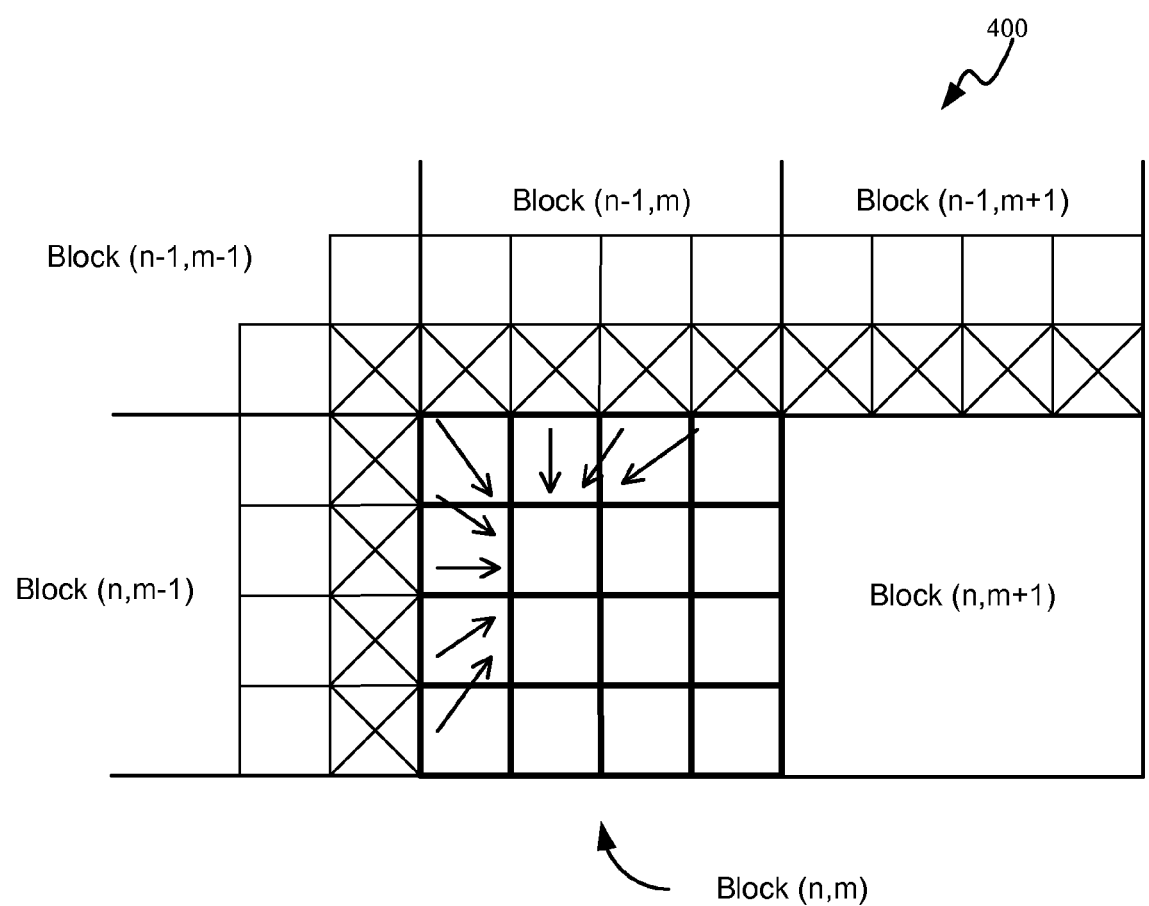
FIG. 4 is a diagram that illustrates a current block and adjacent blocks for direction estimation and/or block encoding operations during intra-mode compression, in accordance with an embodiment of the invention.

FIG. 4 is a diagram that illustrates a current block and adjacent blocks for direction estimation and/or block encoding operations during intra-mode compression, in accordance with an embodiment of the invention. Referring to FIG. 4, there is shown a portion of an I-frame 400 in which a current block (n,m) is currently being processed during an encoding operation. Blocks above and to the left of the current block (n,m) have been processed and have had their pixel values reconstructed during encoding. Above and adjacent to the current block (n,m) are block (n−1,m−1), block (n−1,m), and block (n−1,m+1). To the left and adjacent to block (n,m) is block (n,m−1). The edge pixels in the processed blocks that may be used for processing the current block (n,m) are shown marked with an X. To the right and adjacent to the current block (n,m) is next block (n,m+1), which is yet to be processed and therefore has no reconstructed pixels available for use in processing the current block (n,m).

In the example illustrated in FIG. 4, the blocks are 4×4 blocks of pixels. The invention, however, need not be so limited and other block sizes may be utilized.

As described above, the encoding of I-frames in the video hardware accelerator 216 may comprise an intra-mode compression operation in which direction estimation and block encoding of the current block (n,m) may be performed. During direction estimation, a direction from a plurality of determined directions may be selected for a pixel in the current block (n,m). In this example, one of nine (9) possible directions, including a DC direction, may be selected. The various possible directions are shown as arrows in FIG. 4. The direction selection may be based on one or both of previously reconstructed pixel values from those reconstructed pixels that are adjacent to the current block (n,m) and pixel values in the current block (n,m). Direction estimation may be used to take advantage of patterns that may exist in the video frame. Once a direction has been selected, the direction information may be used during a prediction operation of block encoding as described below with respect to FIG. 5.

Figure 5:
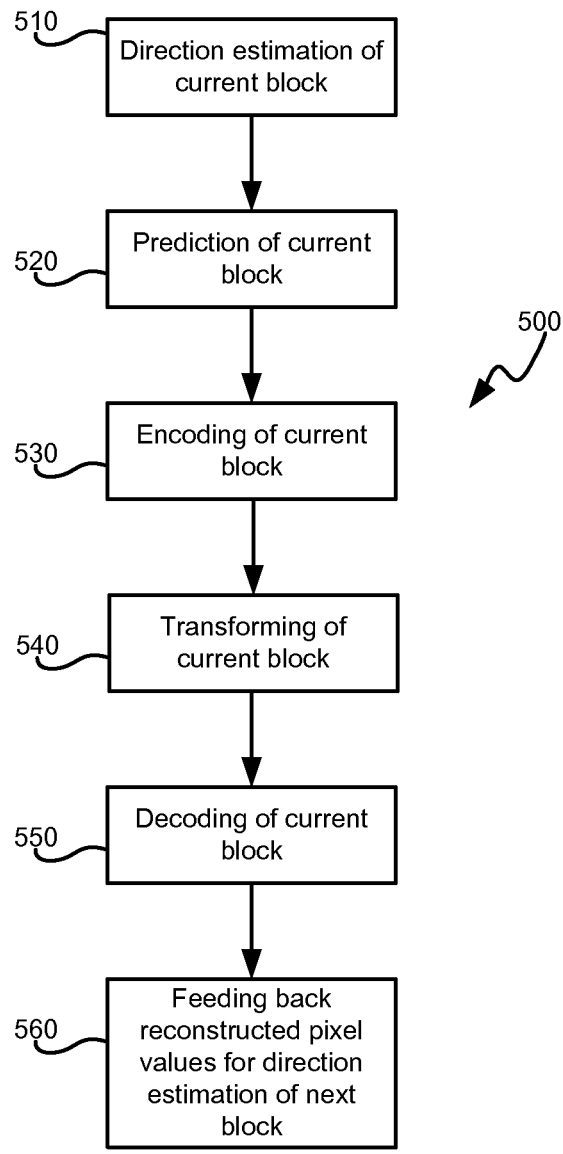
FIG. 5 is a flow chart that illustrates an exemplary direction estimation and block encoding operations during intra-mode compression, in accordance with an embodiment of the invention.

FIG. 5 is a flow chart that illustrates an exemplary direction estimation and block encoding operations during intra-mode compression, in accordance with an embodiment of the invention. Referring to FIG. 5, there is shown a flow chart 500 associated with direction estimation and block encoding during intra-mode compression in the hardware video accelerator 216. In step 510, a direction may be selected for a current block, such as the current block (n,m) in FIG. 4, for example. The direction may be selected based on one or both of previously reconstructed pixel values from those reconstructed pixels that are adjacent to the current block (n,m) and pixel values in the current block (n,m). The direction selected during the direction estimation operation in step 510 may be one of a plurality of determined directions.

In step 520, the block encoding of the current block (n,m) may comprise a prediction operation in which prediction or predicted values for the pixels in the current block (n,m) may be determined based on the selected direction and previously reconstructed pixel values from those reconstructed pixels that are adjacent to the current block (n,m). In step 530, the block encoding of the current block (n,m) may comprise an encoding operation in which desired residual values for the pixels in the current block (n,m) may be determined by subtracting the predicted pixel values from the current pixel values.

In step 540, the block encoding of the current block (n,m) may comprise a transform operation of the desired residual values. The transform operation may comprise an integer transform operation, a quantization operation, an inverse quantization operation, and an inverse transform operation. A set of actual residual values may result from the transform operation in step 540.

In step 550, the block encoding of the current block (n,m) may comprise a decoding operation in which the predicted pixel values may be added to the actual residual values from step 540 to generate reconstructed pixel values for the current block (n,m).

In step 560, the reconstructed pixel values for the current block (n,m) may be fed back to perform a direction estimation of a next block, such as the next block (n,m+1) in FIG. 4, for example.

Figure 6:
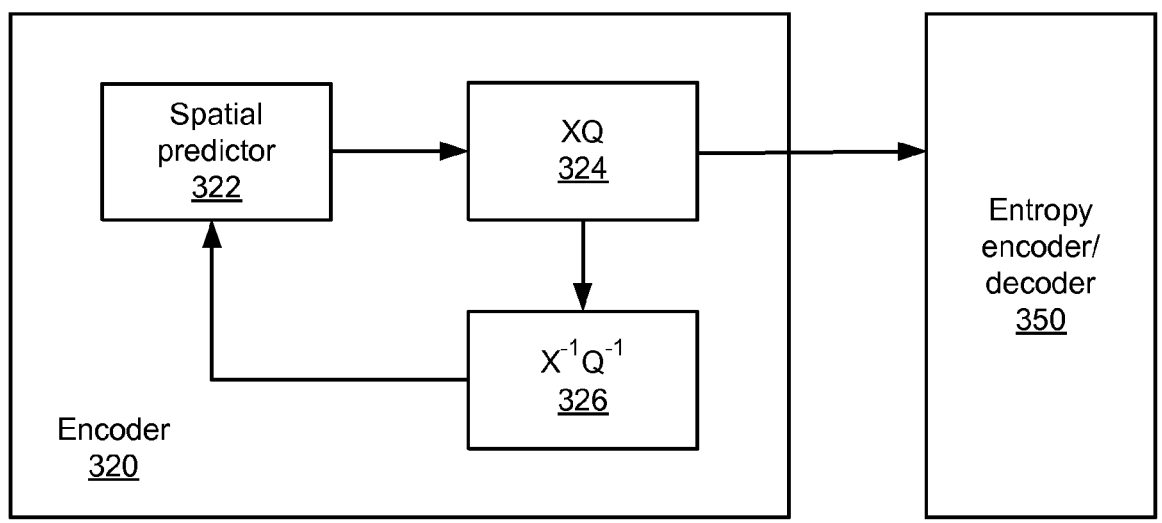
FIG. 6 is a block diagram that illustrates a portion of a hardware video accelerator that is operable to provide direction estimation and block encoding operations during intra-mode compression, in accordance with an embodiment of the invention.

FIG. 6 is a block diagram that illustrates a portion of a hardware video accelerator that is operable to provide direction estimation and block encoding operations during intra-mode compression, in accordance with an embodiment of the invention. Referring to FIG. 6, there is shown a portion of the encoder 320 and the entropy encoder/decoder 350 in the hardware video accelerator 216. The direction estimation operation of a current block, as described above in step 510 of the flow chart 500, may be performed in the spatial predictor 322, for example. The spatial predictor 322 may also be operable to generate the predicted values for the pixels in the current block (step 520) and the desired residual values (step 530). The XQ module 324 may be operable to transform and quantize the desired residual values (step 540) and send the results to the entropy encoder/decoder 350.

The $X^{-1}Q^{-1}$ module 326 may inverse quantize and transform the output from the XQ module 324 (step 540) to generate actual residual values. The $X^{-1}Q^{-1}$ module 326 may communicate the actual residual values to the reconstruction module 327 to generate the reconstructed pixel values for the current block (step 550). The reconstructed pixel values may be fed back to the spatial predictor 322 (step 560) to perform direction estimation of the next block.

The operation described above may be such that at least a portion of a block encoding of a current block of pixels of an I-frame and at least a portion of an estimate of a direction associated with a next block of pixels of the same I-frame are performed concurrently.

Figure 7:
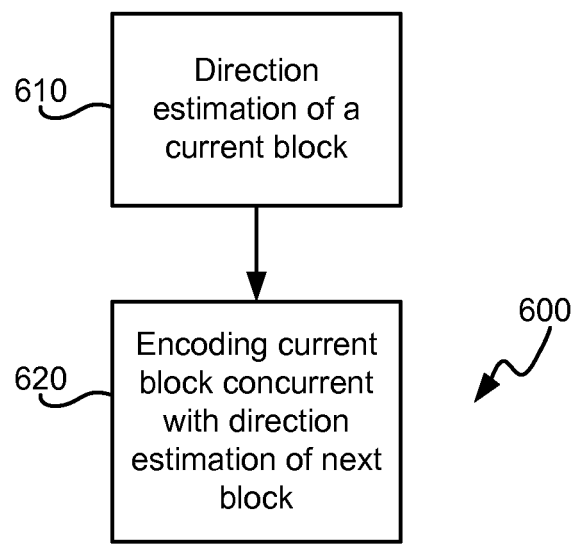
FIG. 7 is a flow chart that illustrates exemplary concurrent direction estimation and block encoding operations during intra-mode compression, in accordance with an embodiment of the invention.

FIG. 7 is a flow chart that illustrates exemplary concurrent direction estimation and block encoding operations during intra-mode compression, in accordance with an embodiment of the invention. Referring to FIG. 7, there is shown a flow chart 600. In step 610, a current block of pixels of a video frame may be encoded in the encoder 320 of the hardware video accelerator 216, for example. In step 620, the encoder 320 may estimate a direction associated with a next block of pixels of the video frame, wherein the direction estimation of the next block of pixels is concurrent with the encoding of the current block of pixels. In this regard, the current block of pixels and the next block of pixels may both be one of a 4×4 block of pixels and an 8×8 block of pixels. Moreover, the current block of pixels and the next block of pixels may each be sub-blocks in a same macroblock of the video frame.

The encoding of step 610 may comprise predicting values for the current block of pixels in, for example, the spatial predictor 322 of the encoder 320, based on an estimated direction associated with the current block of pixels and values of previously reconstructed pixels adjacent to the current block of pixels. The encoding of step 610 may comprise generating in, for example, the spatial predictor 322, first residual values for the current block of pixels based on a difference between values of the current block of pixels and the predicted values of the current block of pixels. The encoding of step 610 may comprise pipelined transforming the generated first residual values to generate second residual values.

The pipelined transforming may comprise integer transforming, in the XQ module 324 of the encoder 320, the generated first residual values to generate integer transformed values. The pipelined transforming may also comprise quantizing, in the XQ module 324, the integer transformed values to generate quantized values. The pipelined transforming may comprise inverse quantizing, in the $X^{-1}Q^{-1}$ module 326 of the encoder 320, the quantized values to generate inverse quantized values. The pipelined transforming may comprise inverse integer transforming, in the $X^{-1}Q^{-1}$ module 326, the inverse quantized values to generate the second residual values.

The encoding of step 610 may comprise decoding the second residual values utilizing the predicted values of the current block of pixels to generate, in the reconstruct module 327 of the encoder 320, reconstructed values of the current block of pixels.

The concurrent encoding/direction estimation of step 620 may comprise feeding back the reconstructed values of the current block of pixels to the spatial predictor 322 for the estimating of the direction associated with the next block of pixels. The direction estimation associated with the next block of pixels may be based on values of previously reconstructed pixels and values of pixels in the next block of pixels.

In one or more embodiments of the invention, a component or components, or at least a portion thereof, described above in accordance with any one of FIGS. 1A-7 may be implemented utilizing one or more processors and/or circuits. Moreover, in one or more embodiments of the invention, a method or methods, or at least a portion thereof, described above in accordance with any one of FIGS. 1A-7 may be performed by one or more processors and/or circuits.

Another embodiment of the invention may provide a non-transitory machine and/or computer readable storage and/or medium, having stored thereon, a machine code and/or a computer program having at least one code section executable by a machine and/or a computer, thereby causing the machine and/or computer to perform the steps as described herein for intra-mode selection without using reconstructed data.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing images, the method comprising:
    encoding, in one or more processors, a current block of pixels of a video frame, where the encoding includes a first pass coarse motion estimation and a second pass fine motion estimation; and
    estimating, in said one or more processors, a direction associated with a next block of pixels of said video frame, wherein said direction estimation of said next block of pixels is concurrent with said encoding of said current block of pixels.

2. The method according to claim 1, wherein said current block of pixels and said next block of pixels are both one of a 4×4 block of pixels and an 8×8 block of pixels.

3. The method according to claim 1, wherein said current block of pixels and said next block of pixels are each sub-blocks in a same macroblock of said video frame.

4. The method according to claim 1, wherein said encoding comprises predicting values for said current block of pixels based on an estimated direction associated with said current block of pixels and values of previously reconstructed pixels adjacent to said current block of pixels.

5. The method according to claim 4, wherein said encoding comprises generating first residual values for said current block of pixels based on a difference between values of said current block of pixels and said predicted values of said current block of pixels.

6. The method according to claim 5, wherein said encoding comprises pipelined transforming said generated first residual values to generate second residual values.

7. The method according to claim 6, wherein said pipelined transforming comprises:
    integer transforming said generated first residual values to generate integer transformed values;
    quantizing said integer transformed values to generate quantized values;
    inverse quantizing said quantized values to generate inverse quantized values; and
    inverse integer transforming said inverse quantized values to generate said second residual values.

8. The method according to claim 6, wherein said encoding comprises decoding said second residual values utilizing said predicted values of said current block of pixels to generate reconstructed values of said current block of pixels.

9. The method according to claim 8, comprising feeding back said reconstructed values of said current block of pixels for said estimating of said direction associated with said next block of pixels.

10. The method according to claim 1, wherein said direction estimation associated with said next block of pixels is based on values of previously reconstructed pixels and values of pixels in said next block of pixels.

11. A system for processing images, the system comprising:
    one or more circuits that are operable to encode a current block of pixels of a video frame, where the encoding includes a first pass coarse motion estimation and a second pass fine motion estimation; and
    said one or more circuits are operable to estimate a direction associated with a next block of pixels of said video frame, wherein said direction estimation of said next block of pixels is concurrent with said encoding of said current block of pixels.

12. The system according to claim 11, wherein said current block of pixels and said next block of pixels are both one of a 4×4 block of pixels and an 8×8 block of pixels.

13. The system according to claim 11, wherein said current block of pixels and said next block of pixels are each sub-blocks in a same macroblock of said video frame.

14. The system according to claim 11, wherein said one or more circuits are operable to predict values for said current block of pixels based on an estimated direction associated with said current block of pixels and values of previously reconstructed pixels adjacent to said current block of pixels.

15. The system according to claim 14, wherein said one or more circuits are operable to generate first residual values for said current block of pixels based on a difference between values of said current block of pixels and said predicted values of said current block of pixels.

16. The system according to claim 15, wherein said one or more circuits are operable to pipelined transform said generated first residual values to generate second residual values.

17. The system according to claim 16, wherein said one or more circuits are operable to:
- integer transform said generated first residual values to generate integer transformed values;
- quantize said integer transformed values to generate quantized values;
- inverse quantize said quantized values to generate inverse quantized values; and
- inverse integer transform said inverse quantized values to generate said second residual values.

18. The system according to claim 16, wherein said one or more circuits are operable to decode said second residual values utilizing said predicted values of said current block of pixels to generate reconstructed values of said current block of pixels.

19. The system according to claim 18, wherein said one or more circuits are operable to feed back said reconstructed values of said current block of pixels for said estimating of said direction associated with said next block of pixels.

20. The system according to claim 11, wherein said one or more circuits are operable to estimate said direction associated with said next block of pixels based on values of previously reconstructed pixels and values of pixels in said next block of pixels.

* * * * *